United States Patent
Coupin (10) Patent No.: US 8,367,773 B2
(45) Date of Patent: Feb. 5, 2013

(54) CHEMICAL BLENDS OF POLYOLEFINS AND POLY(HYDROXY CARBOXYLIC ACID)S

(75) Inventor: Thierry Coupin, Carnieres (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

(21) Appl. No.: 13/120,688

(22) PCT Filed: Oct. 2, 2009

(86) PCT No.: PCT/EP2009/062820
§ 371 (c)(1),
(2), (4) Date: May 19, 2011

(87) PCT Pub. No.: WO2010/037844
PCT Pub. Date: Apr. 8, 2010

(65) Prior Publication Data
US 2011/0213087 A1    Sep. 1, 2011

(30) Foreign Application Priority Data
Oct. 3, 2008   (EP) .................................... 08165864

(51) Int. Cl.
*C08L 67/04*   (2006.01)
*C08L 23/26*   (2006.01)
*C08F 4/64*    (2006.01)

(52) U.S. Cl. ........................ 525/190; 525/64; 525/450

(58) Field of Classification Search .............. 525/64, 525/190, 450
See application file for complete search history.

(56) References Cited

U.S. PATENT DOCUMENTS

| 5,130,371 A | 7/1992 | Fujita et al. |
| 5,173,539 A * | 12/1992 | Boocock et al. ............... 525/244 |
| 6,306,782 B1 | 10/2001 | Tsai et al. |
| 2008/0076880 A1 | 3/2008 | Nakagawa et al. |
| 2009/0270524 A1 | 10/2009 | Oka et al. |
| 2009/0326152 A1 * | 12/2009 | Li et al. ........................ 525/190 |

FOREIGN PATENT DOCUMENTS

JP   2005-307128 A  * 11/2005

OTHER PUBLICATIONS

Machine translation of JP 2005-307128A; published Nov. 2005.*
Want Ta-Yong et al, "Copolymerization of 5-ethyliden-2-norbornene with ethylene using metallocene-methlaluminoxane catalysts", Mar. 1, 1996. Compendex.

* cited by examiner

*Primary Examiner* — Fred M Teskin (57) ABSTRACT

A process is described for obtaining a chemical blend of a polyolefin with a poly(hydroxy carboxylic acid) by mixing poly(hydroxy carboxylic acid) with at least one polyolefin in the presence of a compatibilising compound having at least one polymerisable double bond and at least one electrophilic functional group. The invention also relates to the chemical blend obtainable according to this process, as well as the use of the compatibilising compound to obtain chemical blends of polyolefin with poly(hydroxy carboxylic acid).

8 Claims, 6 Drawing Sheets

CHEMICAL BLENDS OF POLYOLEFINS AND POLY(HYDROXY CARBOXYLIC ACID)S

CROSS-REFERENCE TO RELATED APPLICATIONS

This application claims the benefit of PCT/EP2009/062820, filed Oct. 2, 2009, which claims priority from EP 08165864.3, filed Oct. 3, 2008.

FIELD OF THE INVENTION

The invention is related to the field of polyolefins, preferably prepared with single-site catalysts. In particular, the invention covers a process for obtaining mixtures of polyolefins preferably prepared with single-site catalysts and poly(hydroxy carboxylic acid)s that are rendered compatible.

BRIEF INTRODUCTION

In the past few years, the general public has become increasingly apprehensive of the impact man-made waste has on the environment. Hence there is a growing interest in developing novel biodegradable (and preferably compostable) plastics from renewable resources.

One particularly interesting candidate for this task is poly(hydroxy carboxylic acid), in particular poly(lactic acid) (PLA), now commercially available. The lactic acid is obtained from plants such as corn and sugar-cane or other sugar- or starch-producing plants. Not only is PLA obtainable from renewable materials, it is also industrially compostable. For these reasons, there is significant interest in using PLA as a substitute in applications, where petroleum-based thermoplastics have conventionally been used.

Unfortunately, PLA used on its own does not have the same advantageous properties as conventional plastics do. In particular PLA has performance problems related to heat resistance, brittleness and limited flexibility, resulting in poor mechanical strength. On the other hand, polyolefins have much better mechanical properties. It has been attempted to combine these properties by blending PLA with polyolefins to obtain a resin that is at least partially from renewable resources, but still has acceptable mechanical properties. However, up until now it has been proven difficult, even impossible, to obtain PLA and polyolefin blends, wherein the two components are compatible, due to the differences in polarity. Furthermore, since such physical blends are non-homogeneous it is almost impossible to use these blends in certain applications. Indeed, when merely physically mixing PLA with a polyolefin, it was impossible to spin a fibre from the physical blend.

One of the methods used to render the polymers compatible has been to use various compatibilisation agents to obtain more homogeneous physical blends.

EP 1 777 263 A teaches mixing polyolefins with PLA by using a compatibiliser, wherein the compatibiliser is a hydrogenated, diene-based polymer containing at least one functional group selected from carboxyl group, acid anhydride group, epoxy group, (meth)acryl group, amino group, alkoxysilyl group, hydroxyl group, isocyanate group and oxazoline group.

US 2005/0192405 A discloses a polymer alloy of PLA and polyolefins. The two components are made miscible by including a polyalkylacrylic ester and/or a polyvinyl ester, as well as a block copolymer of a polyalkylacrylic ester and a polyolefin and/or a block copolymer of a polyvinyl ester and a polyolefin.

However, up until now there has been no known method to produce chemical blends of polyolefins and PLA.

It is hence an object of the invention to develop a new chemical blend of poly(hydroxy carboxylic acid)s and polyolefins.

It is also an object of the invention to develop a new chemical blend of poly(hydroxy carboxylic acid)s and polyolefins, with which fibres can be spun.

It is further an object of the invention to develop a resin that is at least partially obtainable from renewable resources and has better processability than hitherto known polyolefin and poly(hydroxy carboxylic acid) physical blends.

It is additionally an object of the invention to develop a resin that is at feast partially obtainable from renewable resources and has better melt strength in comparison with polyolefin and poly(hydroxy carboxylic acid) physical blends.

It is another object of the invention to find a resin at least partially composed of materials from renewable resources that can be used in film, thermoforming, blow moulding or extrusion blow moulding.

At least one of the above objects is achieved with the implementation of the current invention.

SUMMARY OF THE INVENTION

The invention covers a process for obtaining a chemical blend of a polyolefin with a poly(hydroxy carboxylic acid) by mixing poly(hydroxy carboxylic acid) with a polyolefin, preferably prepared with at least one single-site catalyst e.g. a metallocene catalyst, in the presence of a compatibilising compound. The compatibilising compound preferably has at least one functional group, comprising a polymerisable double bond, and at least one electrophilic functional group. Examples of suitable compatibilising compounds include functionalised acrylates and methacrylates, preferably glycidyl acrylate and glycidyl methacrylate. Preferably, the concentration of water during blending is at most 1000 ppm, more preferably at most 400 ppm and most preferably at most 250 ppm.

It has been found that the blends obtained according to the invented process are much more homogeneous than previously known physical blends of polyolefins and poly(hydroxy carboxylic acid)s.

The invention also covers the chemical blends obtainable from this process, as well as the use of said compatibilising compounds to form grafted polyolefins i.e. chemically blended polyolefin and poly(hydroxy carboxylic acid).

It has been found that the polyolefin poly(hydroxy carboxylic acid) blends obtained according to the invented process show little or no high shear viscosity increase and higher melt strength in comparison with a corresponding polyolefin and poly(hydroxy carboxylic acid) physical blend. Thus said blends are particularly useful in applications such as blown film applications and/or cast film and/or foam applications and/or fibre applications.

It has also been found that the level of chemical blending of polyolefins with said poly(hydroxy carboxylic acids), preferably poly(lactic acids), can be more precisely and more easily controlled using the method of the invention.

DETAILED DESCRIPTION OF THE INVENTION

It has been surprisingly found that in the presence of both poly(hydroxy carboxylic acid)s and polyolefins, certain compounds can be used to compatibilise poly(hydroxy carboxylic acid)s with polyolefins. Preferably the polyolefin is prepared with at least one single-site catalyst. This invention thus provides a simple method for obtaining chemical blends hitherto not accessible. Previous blends were obtained by mere physical blending.

Several approaches are viable for obtaining these desirable chemical blends, including reacting the poly(hydroxy carboxylic acid)s with the polyolefins during or after polymerisation of either the hydroxy carboxylic acid (e.g. lactic acid) and/or the olefin.

The most advantageous method for obtaining the desired chemical blends of the invention is the post-polymerisation method, because it allows for the most control over the extent of the chemical blending taking place.

The Polyolefin

The polyolefin is generally prepared by the polymerisation of alpha-olefins, preferably propylene and ethylene to produce polypropylene and polyethylene, respectively. The polyolefins prepared according to the present invention can be homopolymers or they can be copolymers of an alpha-olefin e.g. ethylene or propylene, and at least one comonomer.

When copolymerising ethylene, said comonomer is selected from $C_3$ to $C_{10}$ alpha-olefins, such as propylene, 1-butene, 1-pentene, 1-hexene, 1-octene or 1-methylpentene. Preferably, 1-hexene is used as the comonomer for ethylene copolymerisation. When copolymerising propylene, said comonomer is selected from ethylene and $C_4$ to $C_{10}$ alpha-olefins, such as 1-butene, 1-pentene, 1-hexene, 1-octene, 1-methylpentene. Preferably, ethylene is used as the comonomer for propylene copolymerisation. As is known by the person skilled in the art, the average molecular weight can be controlled using hydrogen. Other known means of controlling the average molecular weight are also included herein.

Examples of suitable catalysts for preparing the polyolefin include single site catalysts (in particular metallocene catalysts and late transition metal catalysts), Ziegler-Natta catalysts, chromium catalysts. If required, more than one catalyst of the same or different type can be used, either simultaneously in one reactor, in two parallel reactors or in two reactors connected to each other in series, to obtain multimodal or broader molecular weight distributions.

Preferably, the polyolefin is prepared with at least one single-site catalyst. This can be for example a metallocene catalyst or any other constrained geometry catalyst. Without wishing to be bound by theory, it is thought that the chemical blending of polyolefins in the presence of the appropriate compatibilising compound with poly(hydroxy carboxylic acid)s is improved with a polyolefin prepared with a single-site catalyst due to the particular structure of such polyolefins. It is thought that the chemical blending can be carried out even more successfully, due to a higher amount of double bonds within these polyolefins in comparison to polyolefins prepared using non-single-site catalysts, such as chromium or Ziegler-Natta catalysts.

Preferably, when used, the single-site catalyst is a metallocene catalyst. The metallocene-catalysed polyethylenes are produced using a catalyst system, which comprises a metallocene, an activating agent and optionally a support.

When the polyolefin is prepared using a metallocene catalyst system, any metallocene catalyst known in the art can be used. The metallocenes of the type contemplated as useful for the present invention include those represented by the formula $R_x(Z)_m(Z)_nMQ_k$ wherein M is a metal selected from the group consisting of IVB, VB, and VIB metals of the periodic table and is preferably selected from Ti, Zr, and Hf; each Z is bound to the metal M and is the same or different and is a cyclopentadienyl-type ligand selected from substituted or unsubstituted cyclopentadienyl, indenyl, tetrahydroindenyl, fluorenyl, and octahydrofluorenyl ligands; the optional substituents on the ligand(s), which can be the same or different, can be chosen from an alkyl, alkenyl, aryl, alkylaryl or arylalkyl radical having from 1 to 20 or carbon atoms or a halogen; R is an optional structural bridge linking the Z ligands to each other or linking a Z ligand with the metal M, wherein each R can be selected from a $C_1$-$C_4$ alkylene radical, a dialkyl germanium or silicon or siloxane, or an alkyl phosphine or amine radical, preferably $Me_2C$, ethylene, $Ph_2C$ or $Me_2Si$; x is 1 or 0; and each Q is the same or different and is selected from the group consisting of hydrogen, halogens, aryls, alkyls, alkenyls, alkylaryls, arylalkyls, alkylidenes or alkoxide radical having from 1 to 20 carbon atoms; m, n and k can be selected from 0, 1 and 2, such that m+n+k is equal to the oxidation number of the metal M, unless a Z ligand is linked to the metal M via the optional structural bridge R, in which case m+n+k+x must equal the oxidation number of the metal M. Preferably, when m or n equals 2, the cyclopentadienyl-type ligands, if substituted are symmetrically substituted in positions 2 and/or 4, and more preferably they are unsubstituted.

Examples of metallocenes that can be used among others are ethylene bis(tetrahydroindenyl)zirconium dichloride, ethylene bis(indenyl)zirconium dichloride or ethylene bis(n-butylcyclopentadienyl)zirconium dichloride, dimethylsilyl bis(2-methyl-4-phenylindenyl)zirconium dichloride, dimethylsilyl-bis(2-methylindenyl)zirconium dichloride, dimethylsilyl bis(2-methyl-4,5-benzoindenyl)zirconium dichloride, isopropylidene (cyclopentadienyl)(fluorenyl)zirconium dichloride, isopropylidene (2-methyl-4-tert-butyl-cyclopentadienyl)(fluorenyl)zirconium dichloride, isopropylidene (2-methyl-4-tert-butyl-cyclopentadienyl)(3,6-ditertbutyl-fluorenyl)zirconium dichloride. The most preferred metallocene is ethylene bis(tetrahydroindenyl)zirconium dichloride. Mixtures of different metallocene catalysts can be used if multi-modal polymers are desired. These can be present together in one reactor or separately in a number of reactors, which are connected in series or in parallel.

The activating agent, which activates the metallocene catalyst component, can be any agent known for this purpose such as an aluminium-containing agent, a boron-containing agent or a fluorinated agent. The aluminium-containing activating agent may comprise an alumoxane, an alkyl aluminium, a Lewis acid and/or a fluorinated catalytic support. Preferably the aluminium-containing activating agent is an alumoxane or an alkyl aluminium. More preferably the aluminium compound is an alumoxane. Most preferably the aluminium compound is methylalumoxane.

The alumoxanes that may be used in the process of the present invention are well known by the person skilled in the art and preferably comprise oligomeric linear and/or cyclic alkyl alumoxanes represented by the formula R—(Al(R)—O)$_n$—AlR$_2$ for oligomeric, linear alumoxanes, and (—Al(R)—O—)$_m$ for oligomeric, cyclic alumoxanes, wherein n is from 1 to 40, preferably from 10 to 20, m is from 3 to 40, preferably from 3 to 20, and R is a $C_1$-$C_8$ alkyl group and preferably methyl. Generally, in the preparation of alumoxanes, for example, methylalumoxane (MAO), a mixture of linear and cyclic compounds is obtained.

When alumoxane is not used as the activating agent, one or more aluminiumalkyl represented by the formula AlR$_x$ can be used wherein each R is the same or different and is selected from halogens or from alkoxy or alkyl groups having from 1 to 12 carbon atoms and x is from 1 to 3. Especially suitable are trialkylaluminums, the most preferred being triisobutylaluminum (TIBAL) and triethylaluminum (TEAL).

Suitable boron-containing activating agents may comprise a triphenylcarbenium boronate such as tetrakis-pentafluorophenyl-borato-triphenylcarbenium as described in EP 0427696, or those of the general formula [L'-H]$^+$ [BAr$_1$Ar$_2$X$_3$X$_4$]$^-$ as described in EP 0277004 (page 6, line 30 to page 7, line 7).

The metallocene may be supported according to any method known in the art. In the event it is supported, the support used in the present invention can be any organic or inorganic solid, particularly porous supports such as talc, inorganic oxides, and resinous support material such as polyolefin. Preferably, the support material is an inorganic oxide in its finely divided form.

The polymerisation process can be carried out in a low-pressure polymerisation reactor according to any of the methods known to the person skilled in the art. The polymerization of the polyolefin using a single-site catalyst, Ziegler-Natty catalyst or chromium catalyst can be carried out in gas, solution or slurry phase. Polymerization in slurry phase is used to prepare the medium and high density polyolefin. Gas phase polymerization is preferred to prepare low density polyolefin. Solution polymerization is preferred for the production of very low density polyolefin. A continuous single loop reactor is preferably used for conducting the polymerization under quasi steady state conditions. A double loop reactor may also be used when a bi-modal resin is desired. The polymerization temperature ranges from 20° C. to 125° C., preferably from 60° C. to 95° C. and the pressure ranges from 0.1 MPa to 5.6 MPa, preferably from 2 MPa to 4 MPa, for a time ranging from 10 minutes to 4 hours, preferably from 1 and 2.5 hours.

A continuous single loop reactor is preferably used for conducting the polymerization under quasi steady state conditions. A double loop reactor may also be used when a bi-modal resin is desired. The reactants for the polymerisation process can be added to the polymerisation reactor together simultaneously or separately in any order, as is known to the person skilled in the art.

The polyolefin resin for the purposes of the present invention can be prepared with either a single site catalyst, in a one- or two-loop reactor or with a catalyst system comprising several single site components and it has therefore either a monomodal or a bimodal molecular weight distribution (MWD). A narrow molecular weight distribution is preferred. The molecular weight distribution can be completely defined by means of a curve obtained by gel permeation chromatography. Generally the molecular weight distribution is more simply defined by a parameter known as the dispersion index D, which is the ratio between the average molecular weight by weight ($M_w$) and the average molecular weight by number ($M_n$). The dispersion index constitutes a measure of the width of the molecular weight distribution. It is of from 2 to 7, preferably of from 2 to 5.

During polymerisation hydrogen is used to control the average molecular weight and in consequence the melt index of the polyolefin.

The polypropylenes for the purposes of the present invention have a melt index, measured according to norm ISO 1133, condition L, at a temperature of 230° C., using a weight of 2.16 kg. The person skilled in the art is aware that the suitable melt flow range of the polypropylene depends upon the respective method of forming an article. Thus, for cast film extrusion the preferred melt flow index range is from 3.0 dg/min to 15 dg/min. For blown film extrusion the preferred melt flow index range is from 0.3 dg/min to 3.0 dg/min. For blow moulding the preferred melt flow index range is from 0.3 dg/min to 3.0 dg/min. For sheet extrusion the preferred range is from 2.0 dg/min to 10 dg/min. For polypropylene fibres the preferred melt flow index range is from 1.8 to 25 dg/min.

The polyethylenes for the purposes of the present invention have a melt index, measured according to norm ISO 1133, condition D, at a temperature of 190° C., using a load of 2.16 kg. The person skilled in the art is aware that the suitable melt flow range of the polyethylene depends upon the respective method of forming an article. Thus, for cast film extrusion the preferred melt flow index range is from 3.0 dg/min to 15 dg/min. For blown film extrusion the preferred melt flow index range is from 0.3 dg/min to 3.0 dg/min. For blow moulding the preferred melt flow index range is from 0.3 dg/min to 3.0 dg/min. For sheet extrusion the preferred range is from 2.0 dg/min to 10 dg/min. For polyethylene fibres the preferred melt flow index range is from 8 to 17 dg/min.

The polyethylenes for the purposes of the present invention have a density of at least 0.920 g/cm$^3$, preferably of at least 0.925 g/cm$^3$, and most preferably of at least 0.927 g/cm$^3$. They have a density of at most 0.965 g/cm$^3$, preferably of at most 0.960 g/cm$^3$, more preferably of at most 0.955 g/cm$^3$, even more preferably of at most 0.950 g/cm$^3$, and most preferably of at most 0.945 g/cm$^3$. The density is measured at 23° C. following the method described in ASTM D 1505. The density of the polyethylene is regulated by the amount of comonomer(s) in the polyolefin. A lower density requires a higher comonomer concentration in the reactor.

The Poly(Hydroxy Carboxylic Acid)

The poly(hydroxy carboxylic acid) can be any polymer wherein the monomers are derived from renewable resources and comprise at least one hydroxyl group and at least one carboxyl group. The hydroxy carboxylic acid monomer is preferably obtained from renewable resources such as corn and sugar cane or other sugar- or starch-producing plants. Preferably the poly(hydroxy carboxylic acid) used in the invention is preferably obtained from renewable resources. The term "poly(hydroxy carboxylic acid)" includes homo- and co-polymers herein and blends of one or more of such polymers.

The poly(hydroxy carboxylic acid) can be represented as in Formula I:

Formula I wherein
R9 is hydrogen or a branched or linear alkyl comprising from 1 to 12 carbon atoms;
R10 is optional and can be a branched, cyclic or linear alkylene chains comprising from 1 to 12 carbon atoms; and
"r" represents the number of repeating units of R and is any integer from 30 to 15000.

The monomeric repeating unit is not particularly limited, as long as it is aliphatic and has a hydroxyl residue and a carboxyl residue. Examples of possible monomers include lactic acid, glycolic acid, 3-hydroxybutyric acid, 4-hydroxybutyric acid, 4-hydroxyvaleric acid, 5-hydroxyvaleric acid and 6-hydroxycaproic acid to make for example poly(lactic acid), poly(glycolic acid), poly(3-hydroxybutyric acid), poly(4-hydroxybutyric acid), poly(4-hydroxyvaleric acid), poly(5-hydroxyvaleric acid) and poly(6-hydroxycaproic acid), respectively.

The monomeric repeating unit may also be derived from a cyclic monomer or cyclic dimer of the respective aliphatic hydroxycarboxylic acid. Examples of these include lactide, glycolide, β-propiolactone, β-butyrolactone, γ-butyrolactone, γ-valerolactone, δ-valerolactone, ε-caprolactone and the like.

In the case of asymmetric carbon atoms within the hydroxy carboxylic acid unit, each of the D-form and the L-form as well as mixtures of both may be used. Racemic mixtures can also be used.

The poly(hydroxy carboxylic acid) may optionally comprise one or more comonomer(s).

The comonomer can be a second different hydroxycarboxylic acid as defined above in Formula I. The weight percentage of each hydroxycarboxylic acid is not particularly limited.

The comonomer can also comprise dibasic carboxylic acids and dihydric alcohols. These react together to form aliphatic esters, oligoesters or polyesters as shown in Formula II, having a free hydroxyl end group and a free carboxylic acid end group, capable of reacting with hydroxy carboxylic acids, such as lactic acid and polymers thereof.

Formula II wherein
R11 and R12 are branched or linear alkylenes comprising from 1 to 12 carbon atoms and can be the same or different;
"t" represents the number of repeating units T and is any integer of at least 1

These copolymers are also within the scope of the invention. The sum of the number of repeating units "r" (Formula I) and "t" (Formula II) is any integer from 30 to 15000. The weight percentages of each monomer i.e. the hydroxycarboxylic acid monomer and the aliphatic ester, oligoester or polyester comonomer of Formula II are not particularly limited. Preferably, the poly(hydroxy carboxylic acid) comprises at least 50% by weight (wt %) of hydroxycarboxylic acid monomers and at most 50% by weight (wt %) of aliphatic ester, oligoester or polyester comonomers.

The dihydric alcohols and the dibasic acids that can be used in the aliphatic polyester unit as shown in Formula II are not particularly limited. Examples of possible dihydric alcohols include ethylene glycol, diethylene glycol, triethyleneglycol, propylene glycol, dipropylene glycol, 1,3-butanediol, 1,4-butanediol, 3-methyl-1,5-pentanediol, 1,6-hexanediol, 1,7-octanediol, 1,9-nonanediol, neopentyl glycol, 1,4-cyclohexanediol, isosorbide and 1,4-cyclohexane dimethanol and mixtures thereof.

Aliphatic dibasic acids include succinic acid, oxalic acid, malonic acid, glutaric acid, adipic acid, pimelic acid, suberic acid, azelaic acid, sebacic acid; undecanoic diacid, dodecanic diacid and 3,3-dimethylpentanoic diacid, cyclic dicarboxylic acids such as cyclohexanedicarboxylic acid and mixtures thereof. The dibasic acid residue in the hydroxy carboxylic acid copolymer can also be derived from the equivalent diacylchlorides or diesters of the aliphatic dibasic acids.

In the case of asymmetric carbon atoms within the dihydric alcohol or the dibasic acid, the D-form and the L-form, as well as mixtures of both, may be used. This includes the possibility of using racemic mixtures.

The copolymer can be an alternating, periodic, random, statistical or block copolymer.

Polymerisation can be carried out according to any method known in the art for polymerising hydroxy carboxylic acids. Polymerisation of hydroxy carboxylic acids and their cyclic dimers is carried out by polycondensation or ring-opening polymerisation, respectively.

Copolymerisation of hydroxycarboxylic acids can be carried out according to any method known in the art. The hydroxycarboxylic acid can be polymerised separately prior to copolymerisation with the comonomer or both can be polymerised simultaneously.

In general, the poly(hydroxy carboxylic acid), homo- or copolymer (copolymerised with a second different hydroxy carboxylic acid or with an aliphatic ester or polyester as described above), may also comprise branching agents. These poly(hydroxy carboxylic acid)s can have a branched, star or three-dimensional network structure. The branching agent is not limited so long as it comprises at least three hydroxyl groups and/or at least three carboxyl groups. The branching agent can be added during polymerisation. Examples include polymers such as polysaccharides, in particular cellulose, starch, amylopectin, dextrin, dextran, glycogen, pectin, chitin, chitosan and derivates thereof. Other examples include aliphatic polyhydric alcohols such as glycerine, pentaerythritol, dipentaerythritol, trimethylolethane, trimethylolpropane, xylitol, inositol and the like. Yet another example of a branching agent is an aliphatic polybasic acid. Such acids include cyclohexanehexacarboxylic acid, butane-1,2,3,4-tetracarboxylic acid, 1,3,5-pentane-tricarboxylic acid, 1,1,2-ethanetricarboxylic acid and the like.

The total molecular weight of the poly(hydroxy carboxylic acid) depends on the desired mechanical and thermal properties of the final resin composition. It is preferably from 5,000 to 1,000,000 g/mol, more preferably from 10,000 to 500,000 g/mol and even more preferably from 35,000 to 200,000 g/mol. Most preferably the total molecular weight of the polymer is from 50,000 to 150,000 g/mol.

The molecular weight distribution is generally monomodal. However, in the case of mixtures of two or more fractions of poly(hydroxy carboxylic acid)s of different weight average molecular weight and/or of different type, the molecular weight distribution can also be multimodal e.g. bi- or trimodal.

From a standpoint of availability, transparency, the renewability and compostability, the poly(hydroxy carboxylic acid) is preferably a poly(lactic acid) (PLA). Preferably the poly (lactic acid) is a homopolymer obtained either directly from lactic acid or from lactide, preferably from lactide.

Thus, preferably the poly(hydroxy carboxylic acid) that is selected is biodegradable and more preferably compostable, for example PLA.

The Compatibilising Compound

The compound which acts as a compatibiliser between the polyolefin, preferably prepared with a single-site catalyst, and the poly(hydroxy carboxylic acid) comprises a polymerisable double bond and an electrophilic functional group. The polymerisable double bond can be present in the form of, for example, an acrylate or a methacrylate group. The electrophilic functional group is a group capable of linking a poly (hydroxy carboxylic acid) chain with another polyolefin chain. The electrophilic functional group can be selected from, but is not limited to, alkyl halide, carboxylic acid, anhydride, sulphonic acid, and epoxide groups. Preferably, the electrophilic functional group is an epoxide. More preferably, the epoxide is present in the form of a glycidyl group.

Examples of suitable compatibilising compounds are thus glycidyl methacrylate, glycidyl acrylate and the like. More preferably the compound is glycidyl acrylate or glycidyl methacrylate, most preferably, glycidyl methacrylate.

Without being bound by theory, it is believed that the polymerisable double bond reacts with the polyolefin chain and the electrophilic group reacts with the poly(hydroxy carboxylic acid), thus allowing the grafting of the polyolefin with the poly(hydroxy carboxylic acid). As a result the two components are rendered compatible in a chemical blend.

The polyolefin is reacted with at least one poly(hydroxycarboxylic acid) in the presence of the compatibilising compound, during a post-polymerisation process.

At most 50 wt %, preferably at most 40 wt %, more preferably at most 30 wt % of the total weight of the starting mixture of poly(hydroxycarboxylic acid), polyolefin and compatibilising compound is poly(hydroxy carboxylic acid. Preferably, at least 5 wt %, more preferably at least 10 wt % of the total weight of the starting mixture of poly(hydroxycarboxylic acid), polyolefin and compatibilising compound is poly(hydroxy carboxylic acid).

The compatibilising compound is brought into contact with the polyolefin, which is preferably metallocene-catalysed, and the poly(hydroxycarboxylic acid), which are then mixed together. Mixing can be carried out with any known mixing means known to the person skilled in the art. Mixing can occur for example by magnetic stirring, shear mixing, refluxing, or ultrasonication. Suitable apparatus for shear mixing include a batch process, such as in a Banbury or Brabender Mixer, or in a continuous process, such as in an extruder e.g. a twin screw extruder. Preferably, the mixing means is an extruder, particularly a twin screw extruder, which allows direct injection for further transformation of the extruded polymer. It is also possible to form and recover pellets of the extruded polymer.

In a Brabender Mixer, mixing occurs from at least 20 rpm, preferably at least 30 rpm, more preferably at least 40 rpm. The maximum mixing speed is at most 100 rpm, preferably at most 80 rpm, more preferably at most 70 rpm. The mixing speed is most preferably around 50 rpm.

Preferably, the temperature of mixing ranges from 170° C. to 230° C., depending on the polyolefin with which the compatibilising compound is mixed. In case polypropylene is being blended, the mixing temperature is preferably maintained at a temperature in the range from 180° C. to 230° C., more preferably in the range from 180° C. to 210° C. In case polyethylene is being blended, the mixing temperature is preferably maintained at a temperature in the range from 160° C. to 215° C., more preferably in the range from 180° C. to 210° C.

The time required for the blending can vary broadly and depends on the method of blending employed and the temperature, as is known by the person skilled in the art. The time required is the time sufficient to thoroughly mix the components. Generally, the individual polymers are blended for a time of about 10 seconds up to about 30 minutes, preferably up to about 20 minutes, more preferably up to about 10 minutes.

The amount of compatibilising compound added depends on the desired level of chemical blending of the poly(hydroxycarboxylic acid) onto the polyolefin. The more compatibilising compound that is added, the more reactions that will occur between the polymer chains. In this way, blending can be easily controlled. Preferably, the amount of compatibilising compound added to the polyolefin is at least 0.05 wt % based on the total weight of polyolefin and poly(hydroxy carboxylic acid). More preferably, the amount of compatibilising compound is at least 0.1 wt %. Preferably, the maximum amount of compatibilising compound is at most 1 wt %, more preferably at most 0.7 wt % and most preferably at most 0.5 wt %, based on the total weight of polyolefin and poly (hydroxy carboxylic acid).

The compatibilising compound, preferably glycidyl methacrylate or glycidyl acrylate, are introduced into the mixing means together with the polymerised polyolefin and poly (hydroxy carboxylic acid) via a master batch intermediary comprising the compatibilising compound dispersed in polyolefin. Alternatively, the compatibilising compound master batch comprises compatibilising compound dispersed in poly (hydroxy carboxylic acid).

The master batch intermediary is the preferred form for adding the compatibilising compound to the components i.e. polyolefin and poly(hydroxy carboxylic acid), since this allows a facilitated addition of the compatibilising compound and better dispersion of the compound in the two polymer components. Better dispersion also results in more controlled chemical blending of the polyolefin, and in particular better control of the grafting of the polyolefin with the poly(hydroxy carboxylic acid).

The master batch comprises at least 8 wt %, preferably at least 10 wt %, more preferably at least 12 wt % of the compatibilising compound based on the total weight of the master batch and at most 25 wt %, preferably at most 22 wt % and more preferably at most 20 wt % of the compatibilising compound based on the total weight of the master batch.

The preferred master batch is one, which comprises around 12 to 16 wt % of compatibilising compound, the most preferred master batch having 14 wt % of compatibilising compound based on the total weight of the master batch.

The master batch further comprises a polyolefin and/or a poly(hydroxy carboxylic acid) in an amount of at least 75%, preferably at least 78 wt %, more preferably at least 80 wt % based on the total weight of the master batch. At most the master batch comprises at most 92 wt % of polyolefin, preferably at most 90 wt % and more preferably at most 88 wt % of a polyolefin and/or a poly(hydroxy carboxylic acid).

The polyolefin and/or the poly(hydroxy carboxylic acid) of the master batch can be the same or different to the polyolefin and poly(hydroxy carboxylic acid) to which the master batch is added for the chemical blending to take place. Preferably, if the master batch contains polyolefin, it is the same as the polyolefin to be chemically blended.

The amount of water in the mixing means, preferably an extruder such as a twin-screw extruder, is controlled in order to avoid hydrolysis of the poly(hydroxy carboxylic acid). This is particularly important in the case of poly(lactic acid). Preferably, the concentration of water in the mixing means wherein the mixing reaction takes place is not more than 1000 ppm, preferably not more than 400 ppm, preferably not more than 250 ppm.

The following examples are only provided to illustrate the invention and are not meant to limit the scope of the invention as provided by the claims.

EXAMPLES

Example 1

48 wt % of a metallocene-polymerised polypropylene (mPP) having
- a melt flow index of 15 g/10 min as measured according to ISO 1133, condition L, at a temperature of 230° C. under a load of 2.16 kg,
- a flexural modulus of 1300 MPa, measured according to ISO 178, and
- a notched Izod impact strength of 3 kJ/m$^2$, measured according to ISO 180 was grafted with 48 wt % of poly(lactic acid) (PLA) Terramac® 6201 having
- a density of 1.26 g/cm$^3$ measured according to ASTM D 1505
- a melt flow index of 9-10 g/10 min at 233 ppm H$_2$0 and 18-20 g/10 min at 1000 ppm H$_2$0 measured according to ASTM D 1238, i.e. at 190° C. using a load of 2.16 kg
- a weight average molecular weight Mw of 106940 Da and a MWD 1.75 determined using GPC, where the PLA was dissolved in chloroform and measurements were taken at 25° C. (using k and α constants as applied for measuring polystyrene).

onto the mPP using 4 wt % of a Cesa-Extend® masterbatch from Clariant containing
- 14 wt % of glycidyl methacrylate compatibilising compound,
- 86 wt % of a PLA-containing matrix in a Brabender Internal Mixer at 190° C. at 40 rpm for about 30 minutes to obtain a chemical blend Sample A.

A corresponding physical blend of mPP and PLA (50 wt % of each) was mixed under the same conditions, but without any compatibilising compound to obtain Comparative Sample A'.

Figure 1:
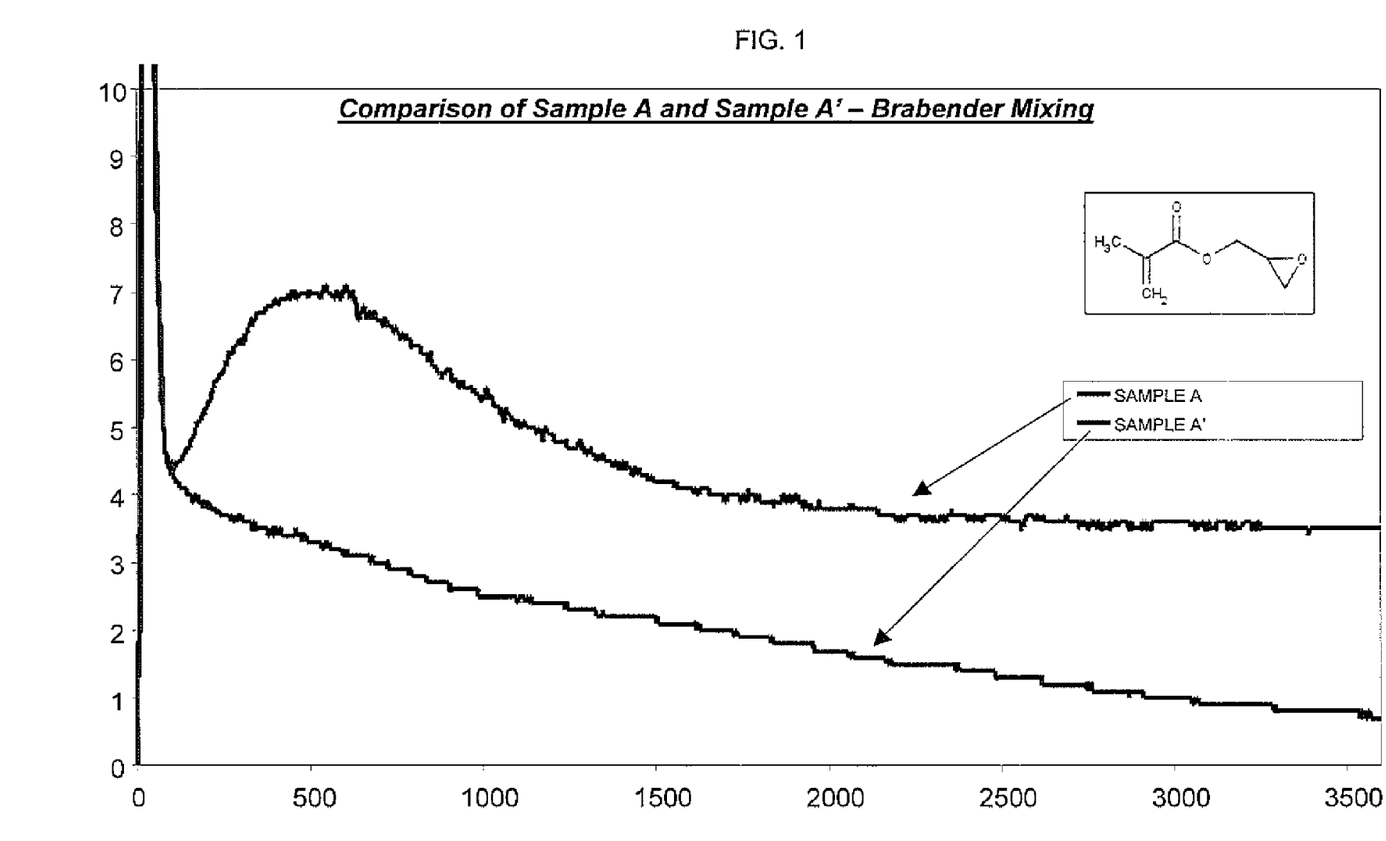
FIG. 1 shows Torque Rheology Properties (in Nm) as a function of time (in seconds) for a chemical blend of a poly(hydroxy carboxylic acid) and a polyolefin using a compound which renders the two components of the blend compatible, in comparison with a physical blend of said polymers without said compound.

FIG. 1 shows the comparison of the Torque rheological properties (Torque in Nm) as a function of time (in seconds) of the chemical blend of mPP being mixed with PLA in the presence of glycidyl methacrylate (Sample A) with the physical blend of mPP being mixing with PLA having no compatibilising compound (Comparative Sample A'). As it can been seen in FIG. 1 Sample A shows a point of maximum viscosity, indicating that chemical blending of PLA with mPP has taken place, thereby increasing the viscosity of the chemical blend. Sample A had an RDA G' viscosity (measured at 150° C. according to the standard method known in the art) of 14157 Pa·s, whereas Sample A' had an RDA G' viscosity of only 7047 Pa·s. Melt strength of the GMA containing Sample A was also higher than Comparative Sample A'.

Example 2

48 wt % of a polypropylene prepared with a Ziegler-Natta catalyst (ZnPP) having
- a melt flow index of 25 g/10 min as measured according to ISO 1133, condition L, at a temperature of 230° C. under a load of 2.16 kg,
- a flexural modulus of 1900 MPa, measured according to ISO 178, and
- a notched Izod impact strength of 4 kJ/m$^2$, measured according to ISO 180 was grafted with 48 wt % of poly(lactic acid) (PLA) Terramac® 6201 having
- a density of 1.26 g/cm$^3$ measured according to ASTM D 1505
- a melt flow index of 9-10 g/10 min at 233 ppm H$_2$0 and 18-20 g/10 min at 1000 ppm H$_2$0 measured according to ASTM D 1238, i.e. at 190° C. using a load of 2.16 kg
- a weight average molecular weight Mw of 106940 Da and a MWD 1.75 determined using GPC, where the PLA was dissolved in chloroform and measurements were taken at 25° C. (using k and α constants as applied for measuring polystyrene).

onto the ZnPP using 4 wt % of a Cesa-Extend® masterbatch from Clariant containing
- 14 wt % of glycidyl methacrylate (GMA) compatibilising compound,
- 86 wt % of a PLA-containing matrix in a Brabender Internal Mixer at 190° C. at 40 rpm for about 30 minutes to obtain a chemical blend Sample B.

A corresponding physical blend of ZnPP and PLA (50 wt % of each) was mixed under the same conditions, but without any compatibilising compound to obtain Comparative Sample B'.

Figure 2:
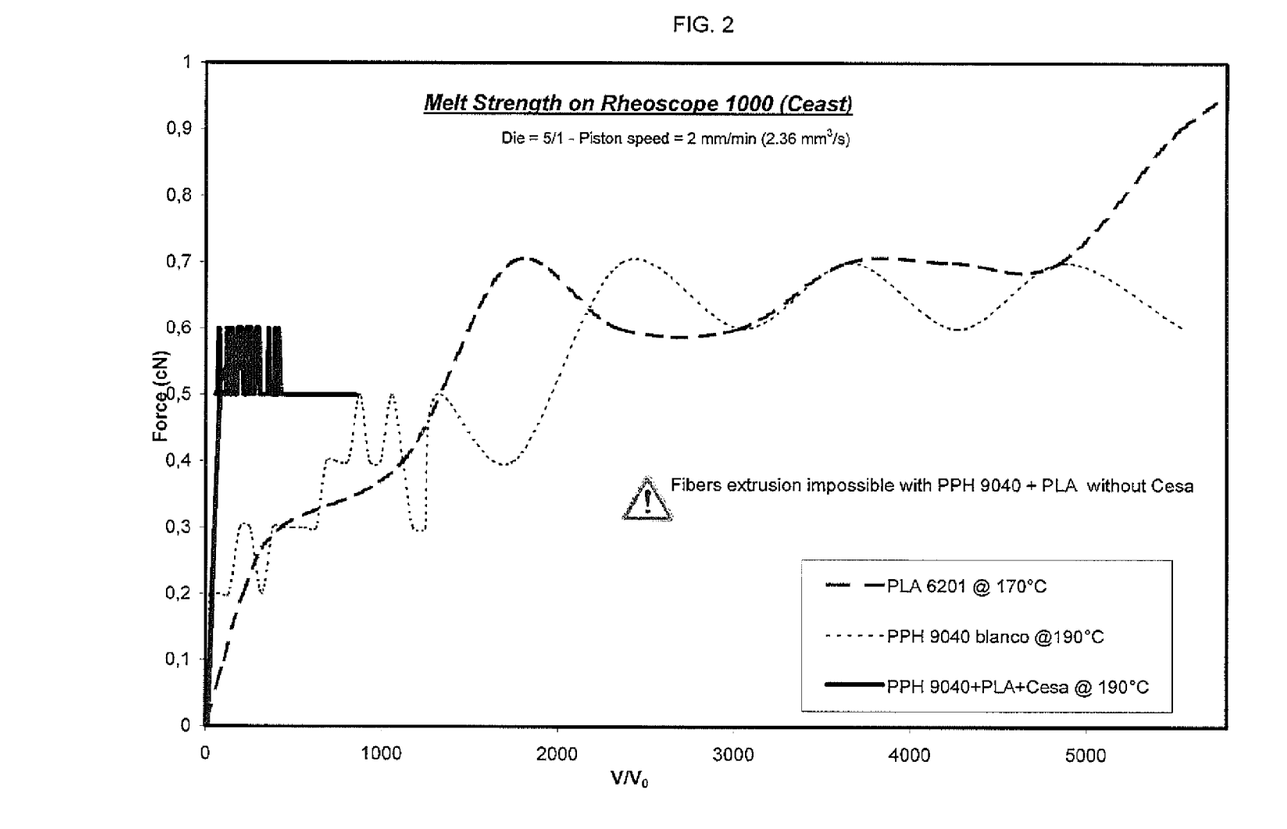
FIG. 2 shows the melt strength on Rheoscope 1000 of Ziegler-Natta polypropylene-containing fibres spun on Ceast as Force (cN) as a function of $V/V_0$.
Figure 3:
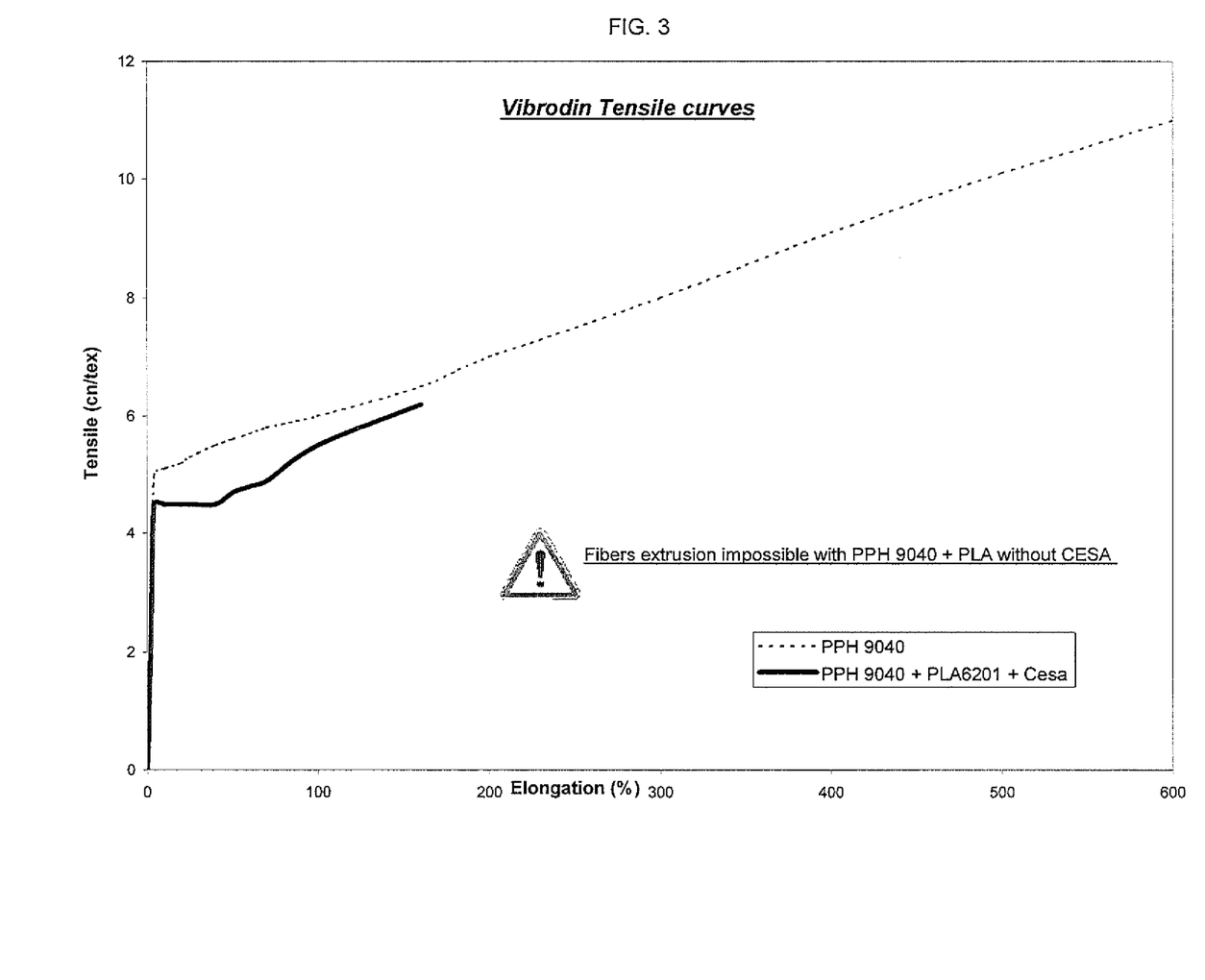
FIG. 3 shows the Vibrodin Tensile Curves as tensile strength (cN/tex) as a function of percentage of elongation of Ziegler-Natta polypropylene-containing fibres spun on Ceast.

FIG. 2 shows that spinning of a fibre was only possible when the GMA-containing Cesa-Extend® was used to obtain a chemical blend of the ZnPP and the PLA. Extrusion into a fibre was possible at low speeds at which melt strength can be seen to be higher than for the individual components. No fibre could be obtained without using Cesa-Extend®.

Melt strengths as shown in FIG. 2 were measured on Rheoscope 1000 (Ceast), the die being at 5/1 with a piston speed of 2 mm/min (2.36 mm$^3$/s) as a function of V/V$_0$ i.e. the linear speed of the wheel V over the speed of the fibre at the exit V$_0$.

The cross-linking and/or grafting of the PLA onto the ZnPP can also be seen in the measure of the activation energy. Cross-linking and/or grafting increases this energy. This means more energy is required to bring the polymers to the melt i.e. to make the individual chains move past each other. Sample B shows a higher energy of activation than the physical blend Sample B', indicating that indeed cross-linking and/or grafting has taken place.

Energy of Activation @230° C. on Blends of ZnPP+PLA

Comparative Sample B': ZnPP+PLA 6201(50/50) @230° C.=195 kJ/mole

Sample B: ZnPP+PLA 6201+Cesa(48/48/4)@230° C.=297 kJ/mole

Figure 4:
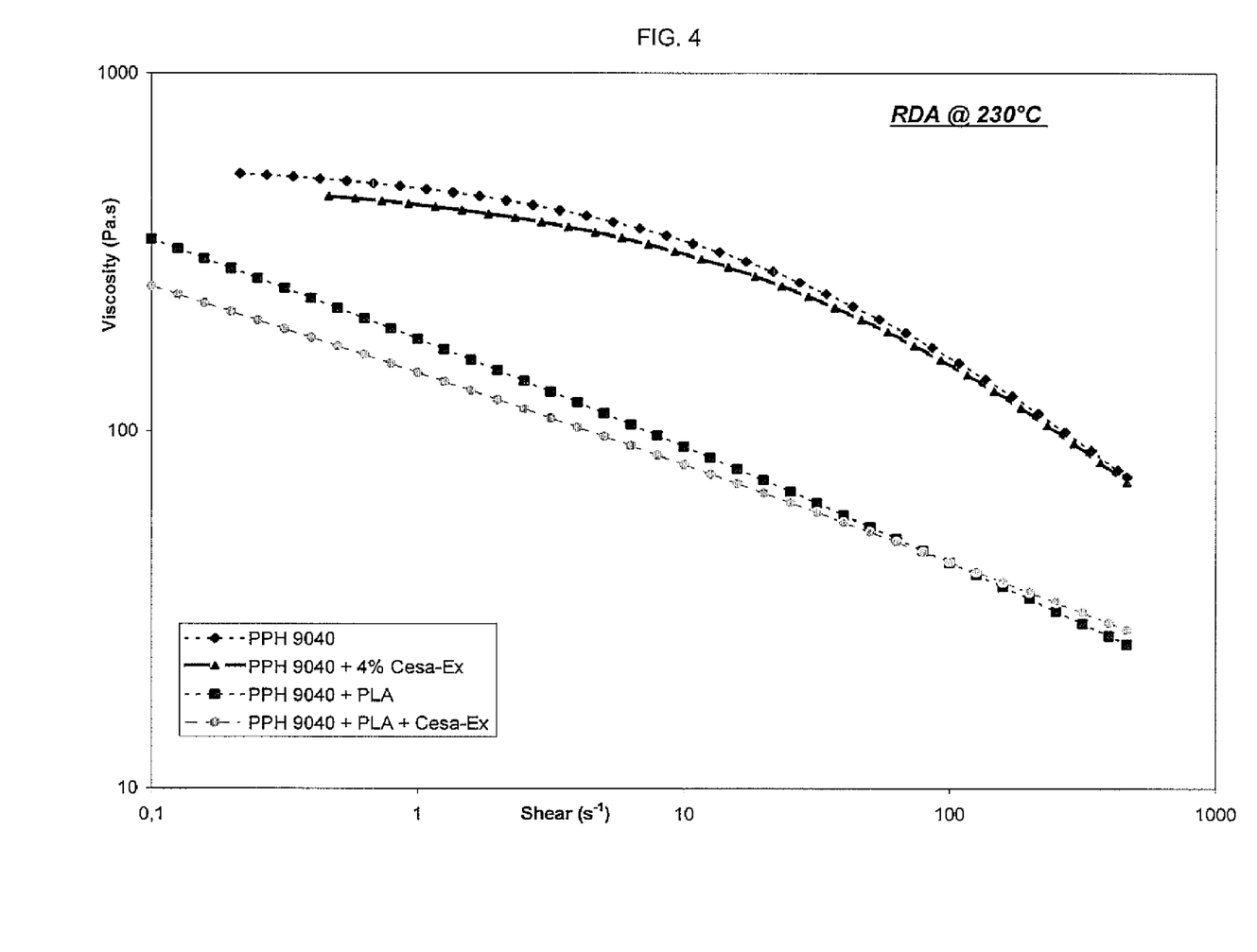
FIG. 4 shows the dynamic rheology analysis (RDA) as Viscosity (Pa·s) as a function of Shear ($s^{-1}$) of Ziegler-Natta polypropylene-containing fibres spun on Ceast.

The energy of activation was determined from the RDA, as seen in FIG. 4. The RDA was obtained by carrying out a frequency sweep on an ARES III.

Example 3

48 wt % of a polyethylene prepared with a metallocene catalyst (mPE) having a melt flow index of 4.0 g/10 min as measured according to ISO 1133 at a temperature of 190° C. under a load of 2.16 kg a density of 940 g/cm$^3$ measured according to ISO 1183 a melting temperature of 126° C., measured according to ISO 11357, and a Vicat temperature of 125° C., measured according to ISO 306 was grafted with 48 wt % of poly(lactic acid) (PLA) Terramac® 6201 having a density of 1.26 g/cm$^3$ measured according to ASTM D 1505 a melt flow index of 9-10 g/10 min at 233 ppm H$_2$O and 18-20 g/10 min at 1000 ppm H$_2$O measured according to ASTM D 1238, i.e. at 190° C. using a load of 2.16 kg a weight average molecular weight Mw of 106940 Da and a MWD 1.75 determined using GPC, where the PLA was dissolved in chloroform and measurements were taken at 25° C. (using k and α constants as applied for measuring polystyrene).

onto the mPE using 4 wt % of a Cesa-Extend® masterbatch from Clariant containing 14 wt % of glycidyl methacrylate (GMA) compatibilising compound, 86 wt % of a PLA-containing matrix in a Brabender Internal Mixer at 190° C. at 40 rpm for about 30 minutes to obtain a chemical blend Sample C.

A corresponding physical blend of mPE and PLA (50 wt % of each) was mixed under the same conditions, but without any compatibilising compound to obtain Comparative Sample C'.

Figure 5:
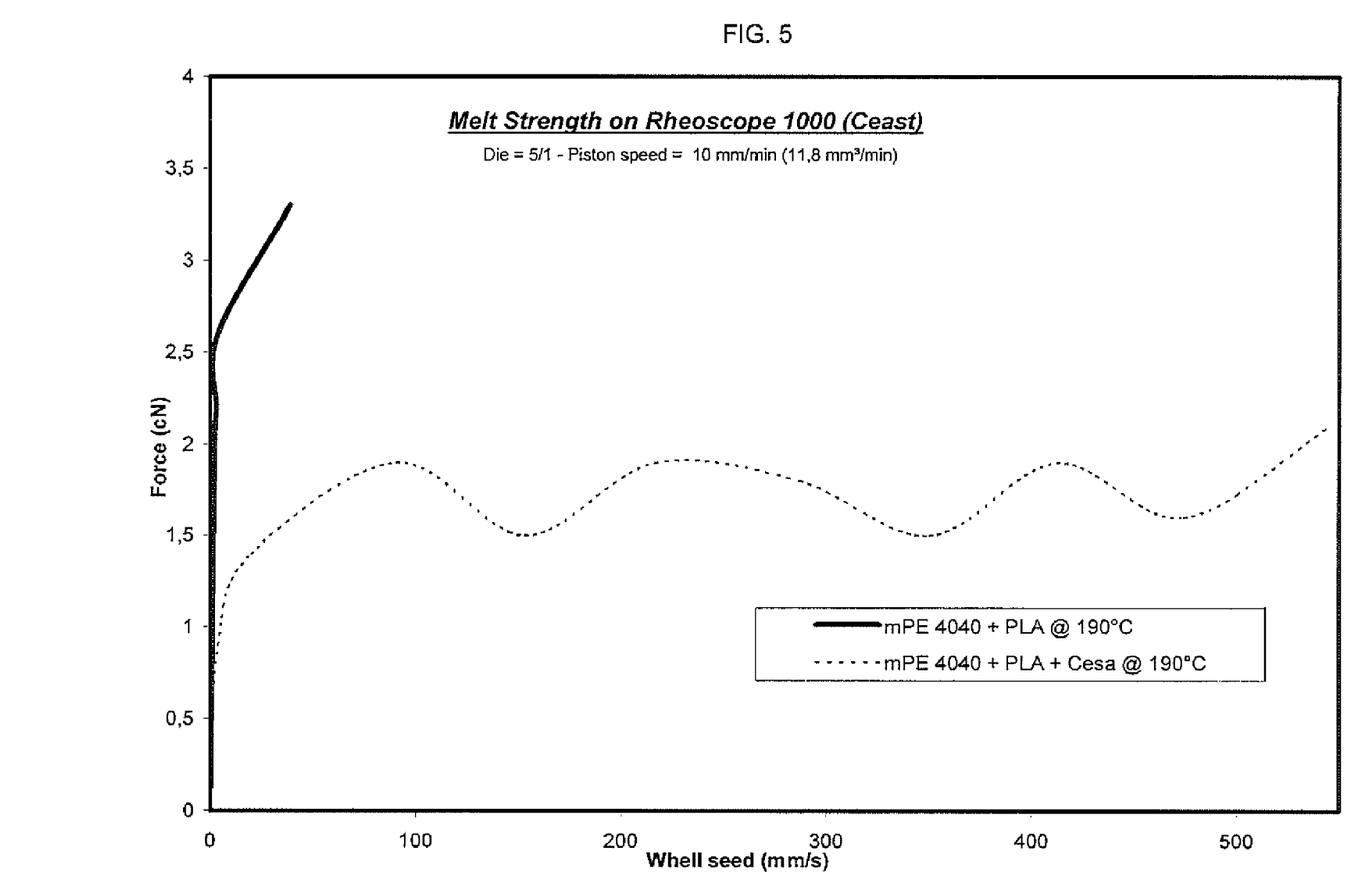
FIG. 5 shows the melt strength on Rheoscope 1000 of metallocene polyethylene-containing fibres spun on Ceast as Force (cN) as a function of Whell speed (mm/s).

FIG. 5 shows that spinning of a fibre was improved when the GMA-containing Cesa-Extend® was used to obtain a chemical blend of the mPE and the PLA. Extrusion into a fibre was possible from low to high speeds. Since it is possible to obtain fibres at high speeds this means it is also possible to reduce the TEX of the fibres i.e. to obtain fibres, which are finer with smaller diameters. Without using Cesa-Extend® the fibre suffered immediate breakage. Melt strengths as shown in FIG. 5 were measured on Rheoscope 1000 (Ceast), the die being at 5/1 with a piston speed of 10 mm/min (11.8 mm$^3$/min).

Figure 6:
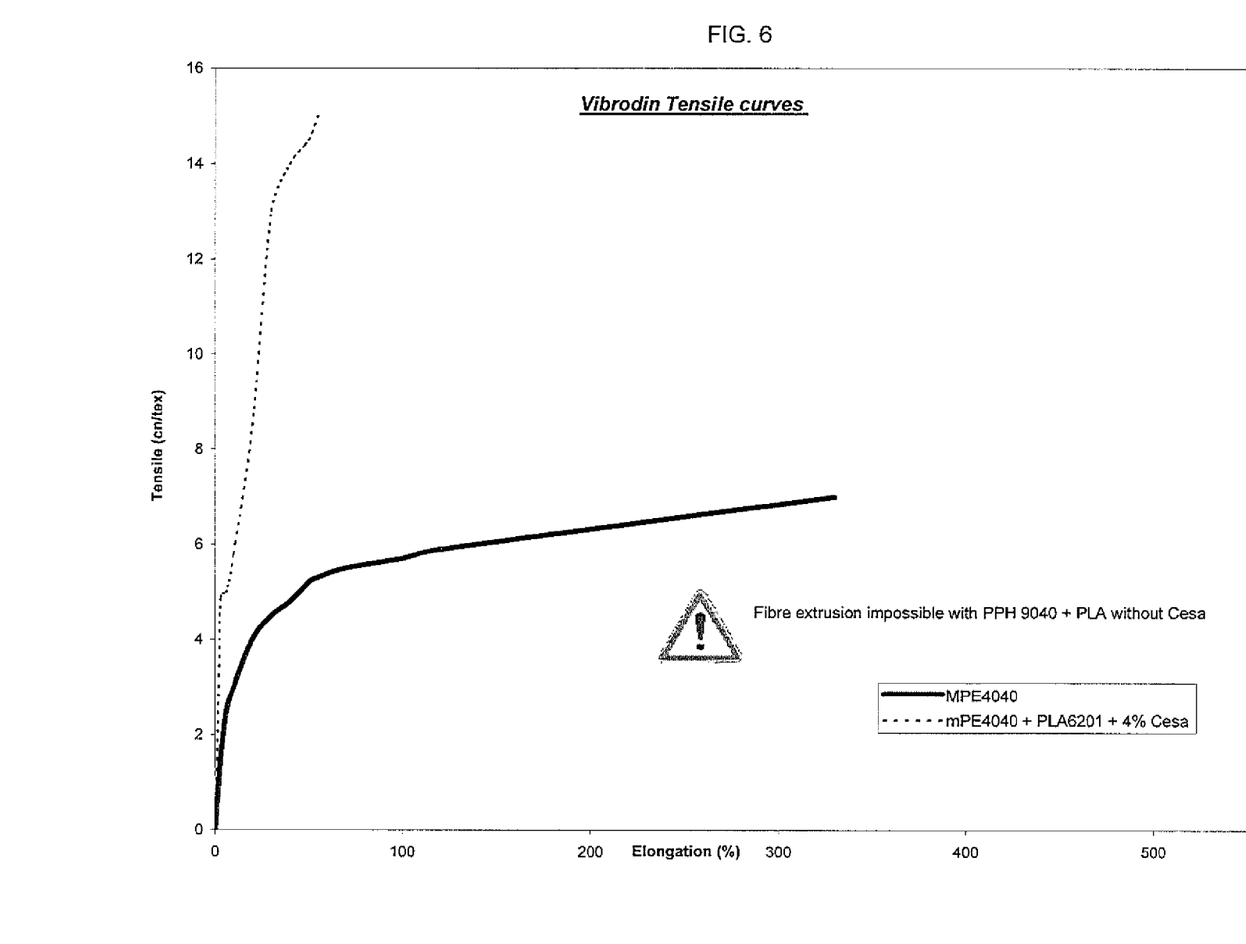
FIG. 6 shows the Vibrodin Tensile Curves as tensile strength (cN/tex) as a function of percentage of elongation of metallocene polyethylene-containing fibres spun on Ceast.

FIG. 6 demonstrates the Vibrodin Tensile Curves using the procedure according to ISO5079 of the fibres produced on Ceast. It can be seen that Cesa-Extend® improves spinning elongation in the melt.

The invention claimed is:

1. A process for obtaining a chemical blend of a polyolefin with a poly(hydroxy carboxylic acid) by blending poly(hydroxy carboxylic acid) with at least one polyolefin in the presence of a compatibilising compound having at least one polymerisable double bond and at least one electrophilic functional group.

2. The process according to claim 1 wherein the polyolefin is prepared with at least one single-site catalyst.

3. The process according to claim 2 wherein the single-site catalyst is a metallocene catalyst.

4. The process according to claim 1 wherein the poly(hydroxy carboxylic acid) is poly(lactic acid).

5. The process according to claim 1 wherein the compatibilising compound's functional group comprising the polymerisable double bond is selected from acrylate and methacrylate.

6. The process according to claim 1 wherein the compatibilising compound's electrophilic functional group is selected from alkyl halide, carboxylic acid, anhydride, sulphonic acid and epoxide groups.

7. The process according to claim 6 wherein the epoxide functional group is present in the form of a glycidyl group.

8. The process according to claim 1 wherein the compatibilising compound is selected from glycidyl acrylate and glycidyl methacrylate.

* * * * *